United States Patent
Riza et al.

(10) Patent No.: US 6,982,818 B2
(45) Date of Patent: Jan. 3, 2006

(54) ELECTRONICALLY TUNABLE OPTICAL FILTERING MODULES

(75) Inventors: Nabeel Agha Riza, Oviedo, FL (US); Muhammad Junaid Mughal, Orlando, FL (US)

(73) Assignee: Nuonics, Inc., Winter Park, FL (US)

( * ) Notice: Subject to any disclaimer, the term of this patent is extended or adjusted under 35 U.S.C. 154(b) by 0 days.

(21) Appl. No.: 10/684,260

(22) Filed: Oct. 10, 2003

(65) Prior Publication Data

US 2004/0109232 A1    Jun. 10, 2004

Related U.S. Application Data

(60) Provisional application No. 60/450,049, filed on Feb. 27, 2003, provisional application No. 60/417,413, filed on Oct. 10, 2002.

(51) Int. Cl.
 *G02F 1/00*  (2006.01)
 *G01J 5/02*  (2006.01)
(52) U.S. Cl. ............ 359/237; 359/285; 359/312; 250/339.07; 250/343
(58) Field of Classification Search ........... 359/237, 359/285, 286, 305, 308, 310–314; 250/399.07, 250/343
See application file for complete search history.

(56) References Cited

U.S. PATENT DOCUMENTS

| | | | | |
|---|---|---|---|---|
| 5,140,599 A | * | 8/1992 | Trutna et al. | 372/20 |
| 6,016,216 A | * | 1/2000 | Chang | 359/285 |
| 6,154,581 A | * | 11/2000 | Lu et al. | 385/11 |
| 6,236,506 B1 | * | 5/2001 | Cao | 359/484 |
| 6,357,913 B1 | | 3/2002 | Kim et al. | |
| 6,549,328 B2 | | 4/2003 | Aoki et al. | |
| 6,624,889 B1 | | 9/2003 | Li | |

* cited by examiner

*Primary Examiner*—Hung Xuan Dang
*Assistant Examiner*—Tuyen Tra
(74) *Attorney, Agent, or Firm*—James H. Beusse; Beusse Brownlee Wolter Mora & Maire, P.A.

(57) ABSTRACT

Electronically agile optical filtering modules for equalizing light propagation differences in at least two spaced optical beam pathways in the modules. The modules use optical polarization rotation devices that may include acousto-optic tunable filter (AOTF) devices, liquid crystal devices, and magneto-optic devices. Such devices may be subject to polarization dispersion losses (PDL) and polarization mode dispersion (PMD) that may be different for when light travel along different light paths through the device. By redirecting light beams back along a different bi-directional path through the devices which may exhibit non-uniform performance across orthogonal polarizations, PDL and PMD may be reduced.

18 Claims, 5 Drawing Sheets

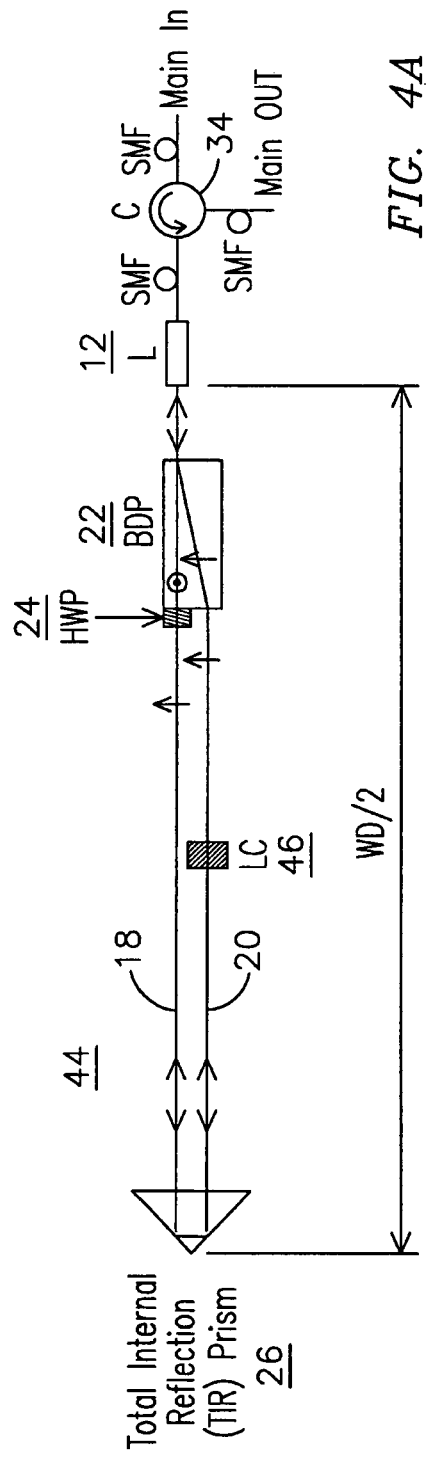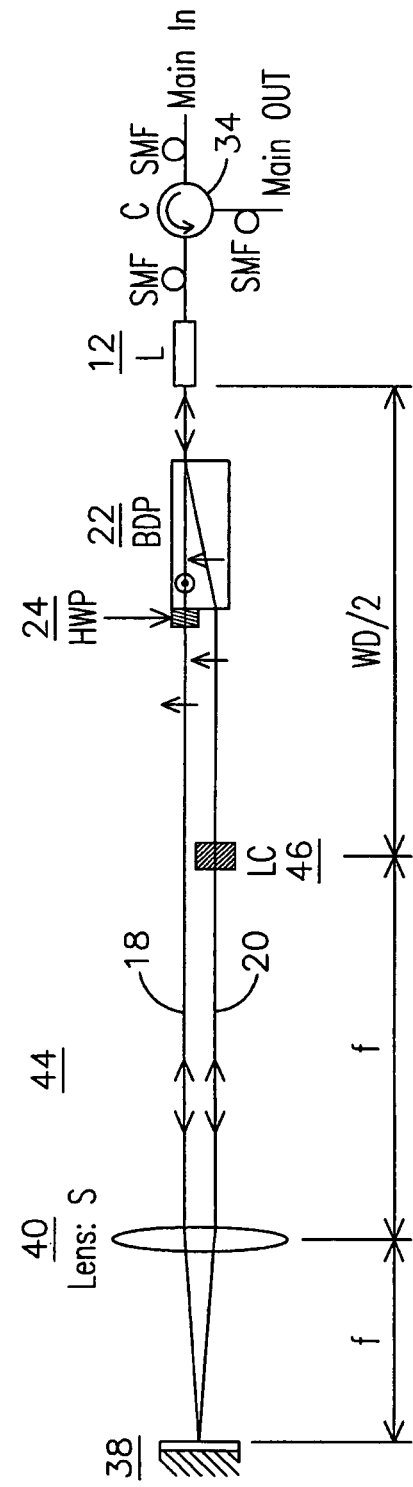
FIG. 4A
FIG. 4B

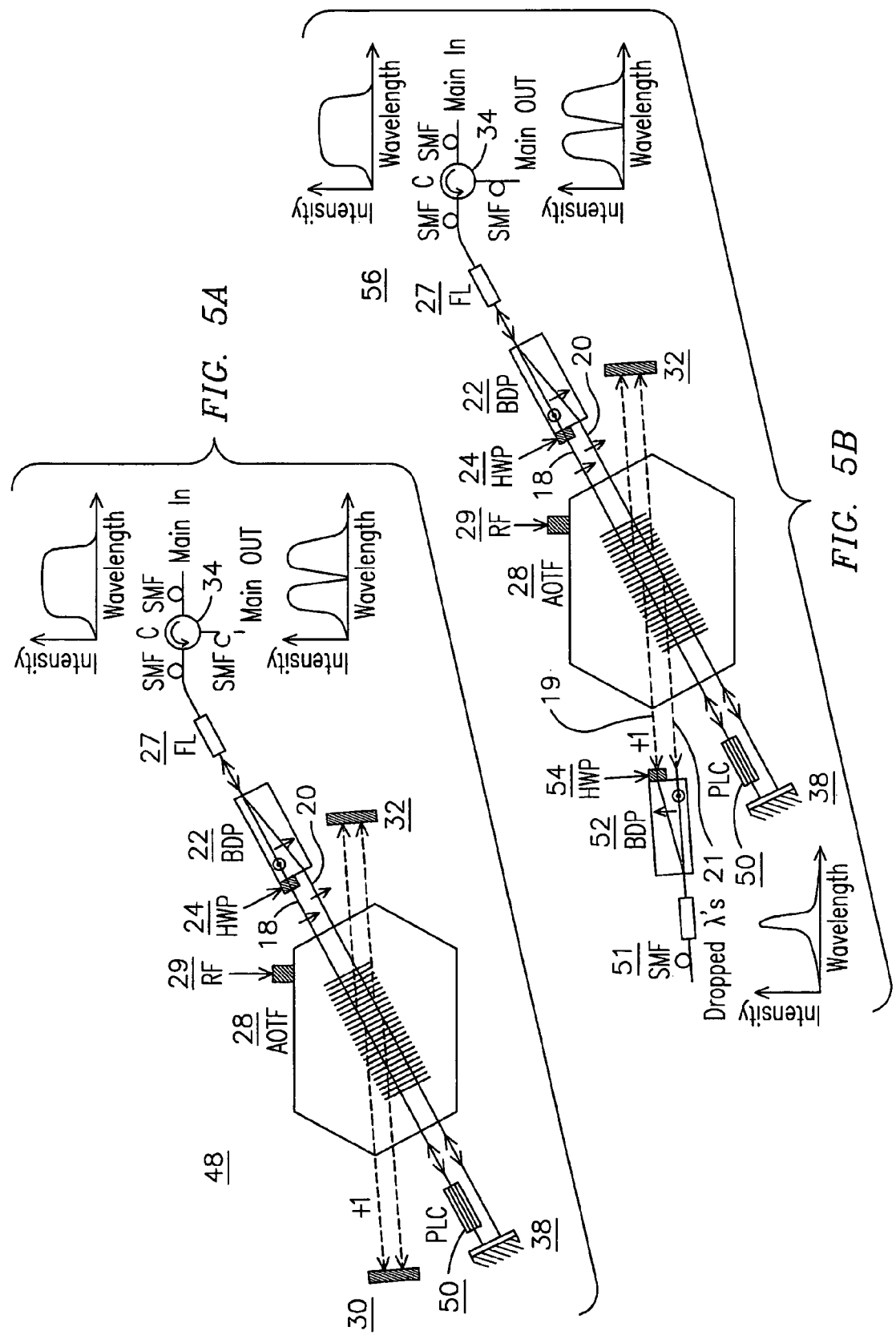

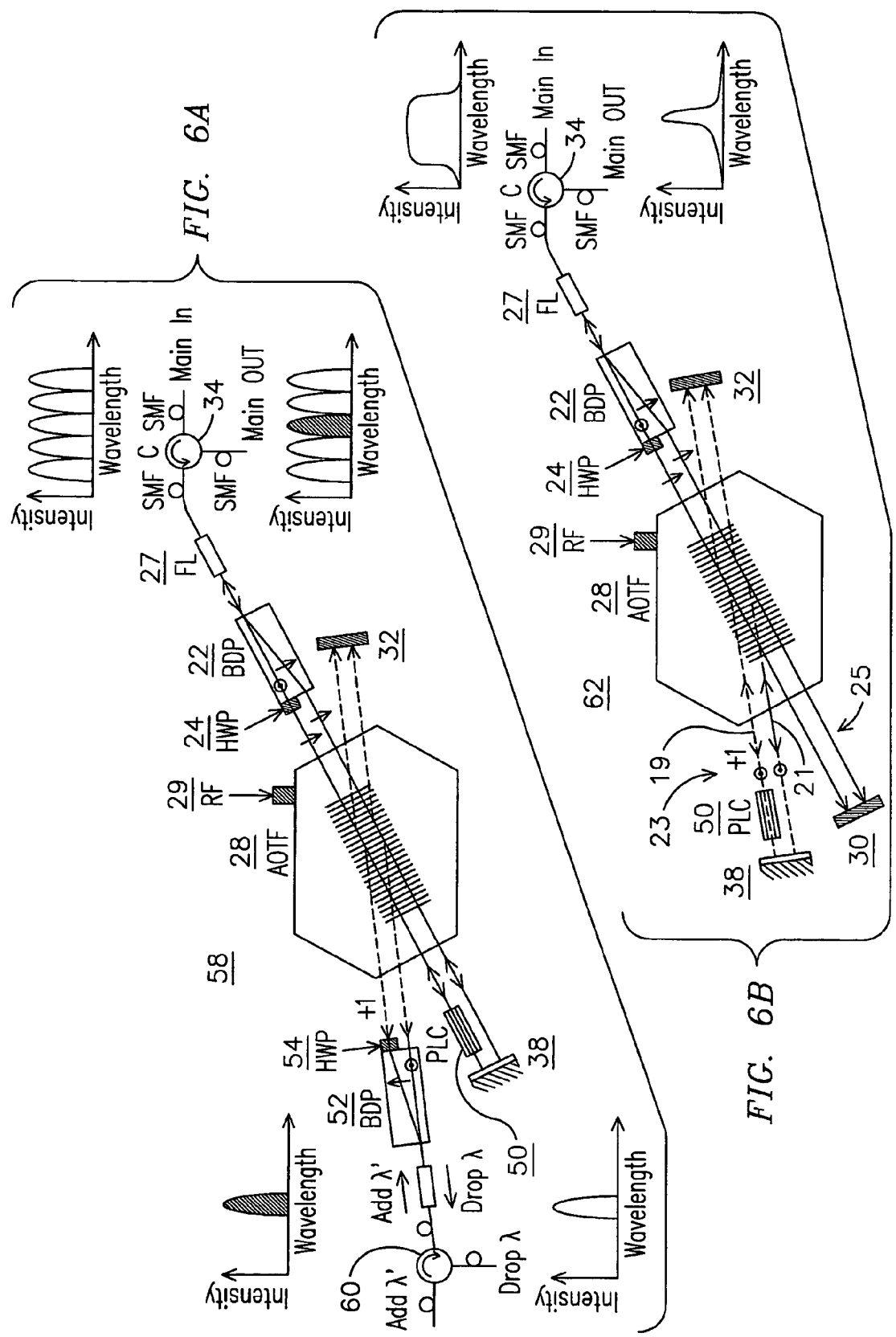

ELECTRONICALLY TUNABLE OPTICAL FILTERING MODULES

SPECIFIC DATA RELATED TO INVENTION

This application claims the benefit of U.S. Provisional Patent Application No. 60/450,049 filed Feb. 27, 2003, and U.S. Provisional Patent Application No. 60/417,413 filed Oct. 10, 2002, incorporated herein by reference.

FIELD OF INVENTION

This application relates generally to optical signal processing, and more particularly, to polarization control devices.

SUMMARY DESCRIPTION OF THE INVENTION

Electronically agile optical filtering modules are used for manipulating optical and electrical signals. The modules use optical polarization rotation devices that may include acousto-optic tunable filter (AOTF) devices, liquid crystal devices, and magneto-optic devices. The AOTF acts as a wavelength sensitive polarization rotation element where diffracted and undiffracted beam optical wavelength, power levels, and polarization state are controlled by selection of bulk AOTF device radio frequency (RF) drive power and frequency position. Although such devices may be subject to polarization dispersion losses (PDL) and polarization mode dispersion (PMD) that may be different for when light travel along different light paths through the device, redirecting light beams back along a different bi-directional path through the device, PDL and PMD, such as may be induced in polarization control devices having non-uniform performance across orthogonal polarizations, may be reduced.

DESCRIPTION OF THE DRAWINGS

FIG. 4A shows a Top View of Liquid Crystal (LC) Variable Optical Attenuator (VOA) using a total internal reflection prism.

FIG. 4B shows a Side View of a Liquid Crystal (LC) Variable Optical Attenuator (VOA) using a lens and mirror combination.

FIG. 5A shows a Polarization Independent Notch filter.

FIG. 5B shows a Polarization Independent Drop filter.

FIG. 6A shows a Reconfigurable Add-Drop Filter.

FIG. 6B shows a Polarization Independent Band Pass filter.

DETAILED DESCRIPTION OF THE INVENTION

A module for reducing PDL and PMD may include a self-aligning optical loop using optical components, such as a beam splitter, or beam displacing polarizer, a circulator, a total internal reflection prism (retro-reflective) or a lens-mirror combination, and a half-wave plate (HWP). Accordingly, for a polarization device that may perform non-uniformly for orthogonal polarizations, the overall polarization dependent loss and polarization-mode dispersion of the structure may be reduced or eliminated. Such a module may be used, for instance, in applications in WDM networks, microwave signal processing, and array radar controls wherein optical or electrical signal filtering is required. In another aspect of the invention, the retro-reflective prism or the mirror-lens combination may be replaced with a mirror and a path length compensator (PLC) to provide PLD compensation when the active device has a polarization balanced performance for both beams passing through the active device, such as an AOTF.

Figure 1:
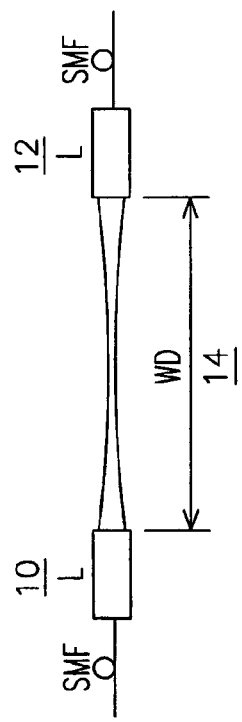
FIG. 1 shows a Prior Art pair of Self-Imaging Fiber Grin Lenses.

FIG. 1 illustrates a pair of self-imaging fiber grin lenses 10, 12 characterized by a working distance 14. FIGS. 2, 3, 5, and 6 illustrate polarization rotation devices using a collinear geometry bulk acousto-optic tunable filter (AOTF) device that operates, for example, on horizontal or p-polarized input light, giving high diffraction at a given wavelength for a given RF drive frequency. For example, the input p-light is deflected and diffracted into an output s-, or vertical, light. However, when using an AOTF device, at the two different physical locations of the two beam light interaction in the AOTF, it is possible to have different polarization performance, i.e, different diffraction efficiencies for the beams. This leads to large (e.g., >1 dB) PDL in the filter. The innovative loop structure described herein reduces this PDL and also reduces PMD, or relative time delay, between the two beams originally separated, for example, by the BDP at the input to the filter.

FIGS. 2–6 show optical beam directions and polarizations for the illustrated embodiments. Important aspects of the illustrated embodiments include (a) use of circulator in loop geometry (b) Use of HWP (or Faraday rotator) with BDP, and (c) use of TIR prism or lens/mirror to cause light looping. Note that using AOTF's with multiple RF frequencies, complex optical and electrical signal processing can be performed using wavelength sensitive manipulations of the optical carrier as they pass through the proposed modules. Finally note that non-collinear AOTF devices plus other polarization control devices (rotation or diffraction based) can also be used in the proposed architectures with minor optical path modifications. The self-imaging technique shown in FIG. 1 may be used to reduce structure loss in the modules (see, for example, Martin van Buren and N. A. Riza, "Foundations for low loss fiber gradient-index lens pair coupling with the self-imaging mechanism," Applied Optics, LP, Vo.42, No.3, Jan. 20, 2003).

Figure 2A:
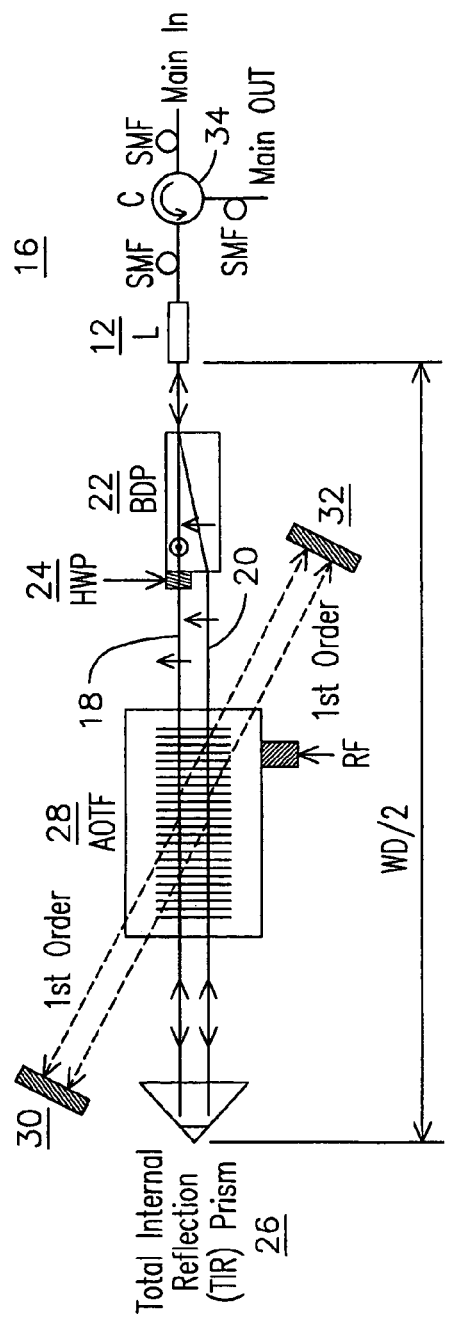
FIG. 2A shows a top view of a filtering system wherein the optical beams from a beam displacement prism (BDP) are horizontally displaced.

FIG. 2A shows a top view of a filtering system 16 wherein the optical beams from the BDP are horizontally displaced along respective light paths 18, 20. The system 16 includes a beam displacement prism (BDP) 22 with a half wave plate (HWP) 24 placed in at least one light path between the AOTF 28 and the BDP 22. A total internal reflection prism (TIR) reflects light back through the AOTF 28. The filter may include blocks 30, 32 for blocking diffracted light. A circulator 34 may be provided with SMF connections to direct an input beam through a grin lens L to the AOTF 28 and redirect a filtered beam received from the AOTF 28.

Figure 2B:
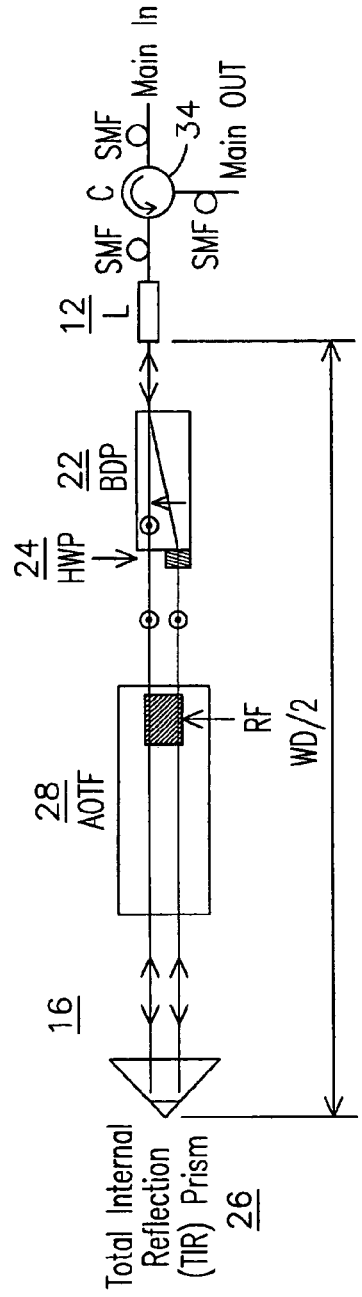
FIG. 2B shows a Side View of the system of FIG. 2A where the optical beams from the BDP are vertically displaced.

FIG. 2B shows a side view of a filtering system of FIG. 2A wherein the optical beams from the BDP 22 are vertically displaced.

Figure 3A:
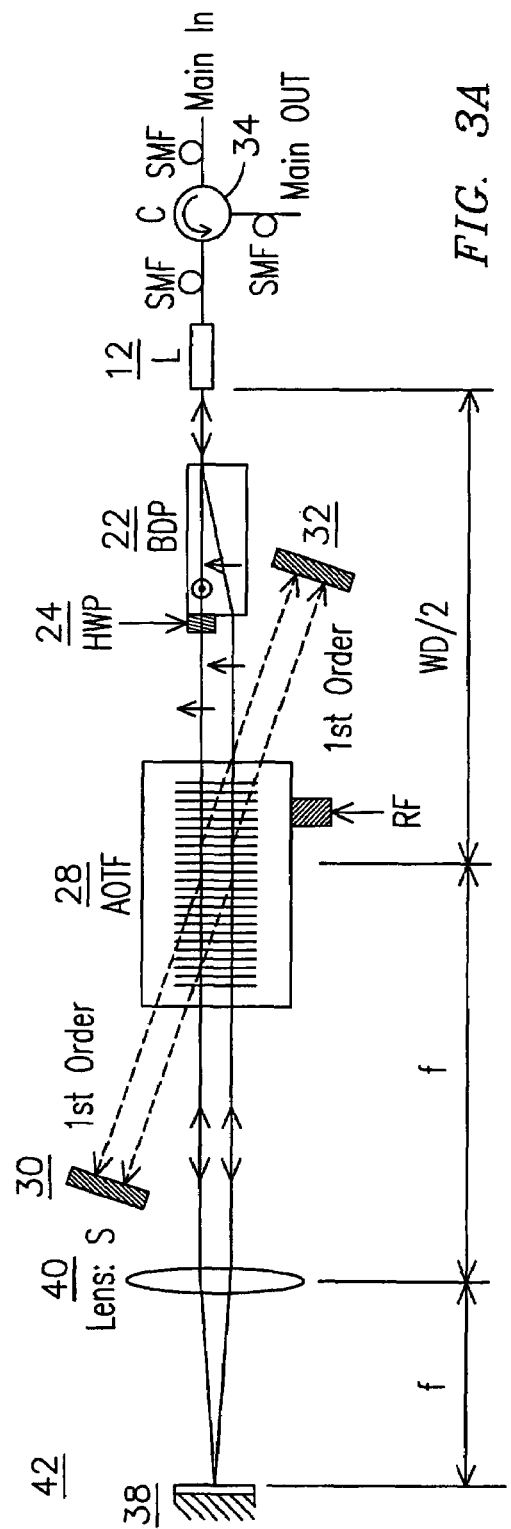
FIG. 3A shows a top view of a filtering system wherein the optical beams from a beam displacement prism (BDP) are horizontally displaced.
Figure 3B:
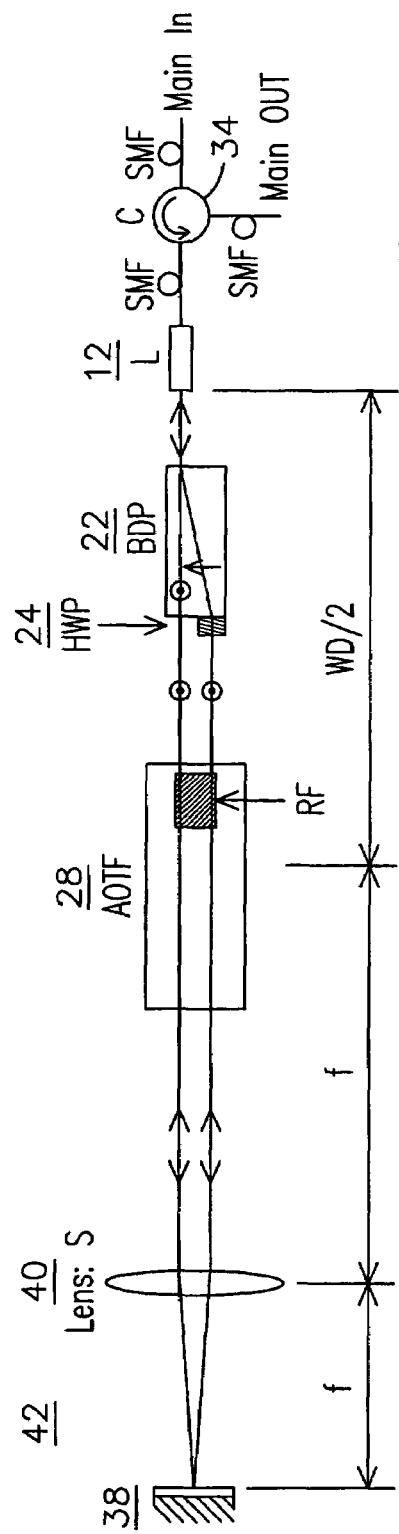
FIG. 3B shows a Side View of the system of FIG. 3A where the optical beams from the BDP are vertically displaced.

FIG. 3A shows a top view of a filtering system 42 wherein the optical beams from the BDP 22 are horizontally displaced. The embodiment depicted in FIG. 3A employs a lens 40 and mirror 38 arrangement instead of the TIR prism 26 of FIG. 2A. The lens, S, may be positioned a focal length, f, from the mirror 38 and a focal length, f, from a diffraction point within the AOTF 28. FIG. 3B shows a side view of the filtering system 42 of FIG. 3A wherein the optical beams from the BDP 22 are vertically displaced.

FIG. 4A shows a top view of Liquid Crystal (LC) Variable Optical Attenuator (VOA) 44. The system includes a BDP 22 with a HWP 24 placed in at least one light path 18, 20 between the TIR 26 and the BDP 22. A LC 46 may be placed in at least one light path 18, 20, such as a different light path 18, 20 than the light path 18, 20 in which HWP 24 is placed, to perform a desired attenuation function. The TIR 26 reflects light back along light paths 18, 20 different from the light path 18, 20 from which light arrived at the TIR 26. A circulator 34 may be provided with SMF connections to direct an input beam through a grin lens L and redirect an attenuated beam received from the grin lens L. FIG. 4B shows a top view of the VOA 44 of FIG. 4B wherein the TIR 26 is replaced with mirror 38 and lens 40 arrangement.

FIGS. 5 and 6 show alternate embodiments of the invention when an active device, such as the AOTF, has minimal PDL, but may still require PMD compensation. The preferred embodiment using the loop geometry with a prism or the mirror plus lens combination can be used within these alternate embodiments (instead of mirror plus PLC) to eliminate PDL along with PMD if needed. FIGS. 5 and 6 show optical beam directions and polarizations for the illustrated embodiments. Important aspects of the illustrated embodiments include (a) use of circulators in retroreflective geometry off either the undiffracted (or DC beam) or the diffracted (+1 and/or −1) order beam, (b) Use of PBSs, HWPs, Spatial filters, and polarizers to route and clean beams, (c) Use of two diffractions via an AOTF to improve filter wavelength characteristics. Also note that because freespace beams are used, special spatial filters (e.g., on-axis pin hole) can be placed throughout the beam paths to eliminate spatial/wavelength noise; this is a unique feature of the proposed freespace-type bulk-AOTF module based designs.

FIG. 5A is a polarization independent notch filter 48 including an AOTF 28 controllable by an RF signal 29. The filter 48 includes a BDP 22 with an HWP 24 placed in at least one light path between the AOTF 28 and the BDP 22. A mirror 38 reflects light back through the AOTF 28 and may include a path length compensator (PLC) 50 placed in at least one light path between the AOTF 28 and the BDP 22. The filter 48 may include blocks 30, 32 for blocking diffracted light. A circulator 34 may be provided with SMF connections to direct an input beam to the AOTF 28 and redirect a filtered beam received from the AOTF 28. A fiber lens (FL) 27 may be provided to direct light propagating in an SMF into freespace.

FIG. 5B is a drop filter 56 including an AOTF 28 controllable by an RF signal 29. The filter 56 includes a BDP 22 with a HWP 24 placed in at least one light path 18, 20 between the AOTF 28 and the BDP 22. A mirror 38 reflects light back through the AOTF 28 and may include PLC 50 placed in at least one light path 18, 20 between the AOTF 28 and the BDP 22. The filter 56 may include block 32 for blocking diffracted light. A circulator 34 may be provided with SMF connections to direct an input beam to the AOTF 28 and redirect a filtered beam received from the AOTF 28. A FL 27 may be provided to direct light propagating in an SMF into freespace. In an aspect of the invention, a second BDP 52 with an HWP 54 placed in at least one diffracted light path 19, 21 between the AOTF 28 and the BDP 28 may be provided to drop a portion of the light beam. With the addition of a circulator 60 the drop filter 56 of FIG. 5B may be used as reconfigurable Add-Drop filter 58 as shown in FIG. 6A.

FIG. 6B depicts a polarization independent band pass filter 62, for example, configured by reflecting, with mirror 38, a diffracted light portion 23 and blocking, with block 30, a non-diffracted light portion 25 from the AOTF 28. A PLC 50 may be placed in at least one diffracted light path 19, 21 between the AOTF 28 and the mirror 38.

The embodiment depicted in FIG. 5B (the drop filter 56) may be used as scanning optical spectrum analyzers or variable tap filters. In this case, to make a spectrum analyzer, the drop port out fiber 51 and BDP 52 can be replaced with a large area detector that measures the power in the chosen wavelength, adding the powers for the two diffracted polarizations. Since the detector measures this power for a given wavelength at a given RF drive frequency, the RF can be swept to take power readings across the entire input light wavelength band. Generally, the AOTF drive power is kept low to tap only say 5% of the light from the input main beam. This way, smooth interruption free monitoring of the optical WDM signal is maintained. In the case the structures is used as a tap filter, in this case the output fiber 51 and BDP 52 at the output drop port are retained and again the AOTF 28 is weakly driven to tap the correct wavelength or wavelengths with their correct moderate to low power levels. Finally note that non-collinear AOTF devices can also be used in the proposed architectures with minor optical path modifications.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of equalizing light propagation differences in at least two spaced optical beam pathways in a polarization medium comprising:

splitting an optical beam emitted from an emission point to produce a first beam portion and a second beam portion;

directing the first optical beam portion in a forward direction in a first optical pathway, and redirecting the first optical beam portion in a reverse direction in a second optical pathway;

directing the second optical beam portion in a forward direction in the second optical pathway, and redirecting the second optical beam portion in a reverse direction in the first optical pathway;

disposing an electronically variable polarization control device in at least one of the first pathway and the second pathway for processing the first beam portion and the second beam portion passing therethrough; and recombining the first optical beam portion traveling in the reverse direction along the second optical pathway and the second optical beam portion traveling in the reverse direction along the first optical pathway into a processed optical beam directed back into the emission point so that each of the optical beam portions traverses the same path from the emission point back into the emission point.

2. An optical processing apparatus for equalizing light propagation differences in at least two spaced optical beam pathways in a polarization medium comprising:
   a beam splitter for splitting an optical beam emitted from an emission point to produce a first beam portion and a second beam portion and recombining respective portions of a split optical beam into a processed optical beam directed back into the emission point;
   a first bi-directional pathway for conducting the first beam portion in a forward direction and the second beam portion in a reverse direction;
   a second bi-directional pathway for conducting the second beam portion in forward direction and the first beam portion in a reverse direction;
   a beam redirecting means for redirecting the first beam portion back along the second bi-directional pathway in the reverse direction and for redirecting the second beam portion back along the first bi-directional pathway in the reverse direction so that each of the beam portions traverses the same path from the emission point back into the emission point; and
   an electronically variable polarization control device disposed in at least one of the first bi-directional pathway and the second bi-directional pathway for processing the first beam portion and the second beam portion passing therethrough.

3. The optical processing apparatus of claim 2, wherein the beam splitter comprises a beam displacement prism.

4. The optical processing apparatus of claim 2, wherein the beam redirecting means comprises a total internal reflection prism.

5. The optical processing apparatus of claim 2, wherein the beam redirecting means comprises a mirror.

6. The optical processing apparatus of claim 5, wherein the beam redirecting means further comprises a lens for directing the first beam portion and second beam portion to the mirror.

7. The optical processing apparatus of claim 5, wherein the beam directing means further comprises a path length compensator disposed in at least one of the first beam portion and the second beam portion.

8. The optical processing apparatus of claim 2, further comprising a half wavelength plate disposed in at least one of the first beam portion and the second beam portion between the beam splitter and the beam redirecting means.

9. The optical processing apparatus of claim 2, wherein the variable polarization control device comprises a first acousto-optical device disposed in the first bi-directional pathway and a second acousto-optical device disposed in the bi-directional optical pathway.

10. The optical processing apparatus of claim 9, wherein the first acousto-optical device and the second acousto-optical device comprise a single device.

11. The optical processing apparatus of claim 2, wherein the variable polarization control device comprises a liquid crystal light valve.

12. The optical processing apparatus of claim 2, further comprising an optical circulator for conducting the optical beam to the beam splitter and redirecting a processed beam returned from the beam splitter.

13. The optical processing apparatus of claim 12, further comprising a fiber grin lens disposed in the optical beam between the circulator and the beam splitter.

14. An optical processing apparatus comprising:
   a beam splitter for splitting a light beam to produce a first beam and a second beam;
   an acousto-optical device comprising a first bi-directional pathway for conducting at least a portion of the first beam and a second bi-directional pathway for conducting at least a portion of the second beam; and
   a beam reflector disposed adjacent the acousto-optical device and configured to reflect the at least a portion of the first beam back along the second bi-directional pathway and for redirecting the at least a portion of the second beam back along the first bi-directional pathway.

15. The optical processing apparatus of claim 14, wherein the beam reflector comprises a total internal reflection prism.

16. The optical processing apparatus of claim 14, wherein the beam reflector comprises a mirror.

17. The optical processing apparatus of claim 16, wherein the beam reflector further comprises a lens for directing the at least a portion of the first beam and at least a portion of the second beam to the mirror.

18. The optical processing apparatus of claim 16, wherein the beam reflector further comprises a path length compensator disposed in at least one of the at least a portion of the first beam and at least a portion of the second beam.

* * * * *